(12) United States Patent
Yu et al.

(10) Patent No.: US 12,293,438 B2
(45) Date of Patent: May 6, 2025

(54) VISUALIZE DATA AND SIGNIFICANT RECORDS BASED ON RELATIONSHIP WITH THE MODEL

(71) Applicant: International Business Machines Corporation, Armonk, NY (US)

(72) Inventors: Wen Pei Yu, Xian (CN); Xiao Ming Ma, Xi'an (CN); Xue Ying Zhang, Xi'an (CN); Si Er Han, Xi'an (CN); Jing James Xu, Xi'an (CN); Jing Xu, Xi'an (CN); Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 18/064,959

(22) Filed: Dec. 13, 2022

(65) Prior Publication Data
US 2024/0193830 A1 Jun. 13, 2024

(51) Int. Cl.
*G06T 11/20* (2006.01)
*G06N 20/00* (2019.01)

(52) U.S. Cl.
CPC ............ *G06T 11/206* (2013.01); *G06N 20/00* (2019.01)

(58) Field of Classification Search
CPC ...... G06T 11/206; G06T 11/20; G06F 3/0481; G06F 17/246; H04L 41/22; G06N 20/00
USPC ........................................................ 345/440
See application file for complete search history.

(56) References Cited

U.S. PATENT DOCUMENTS

| 10,867,420 | B2 | 12/2020 | Zamanakos |
| 11,361,003 | B2 | 6/2022 | Zhu et al. |
| 2012/0311496 | A1* | 12/2012 | Cao ........................ G06F 16/287 715/821 |
| 2017/0286811 | A1* | 10/2017 | Shafer ................... G06V 10/764 |
| 2018/0144518 | A1* | 5/2018 | Vlassis .................... G06F 17/18 |
| 2021/0034980 | A1 | 2/2021 | Xia et al. |
| 2021/0110286 | A1 | 4/2021 | Hewitt et al. |
| 2022/0156512 | A1 | 5/2022 | Abhyankar et al. |
| 2023/0196600 | A1* | 6/2023 | Portail ....................... G06T 7/20 382/286 |

FOREIGN PATENT DOCUMENTS

KR    10-2039154 B1    10/2019

OTHER PUBLICATIONS

Authors et al.: Disclosed Anonymously, "A Method and Apparatus for Exploration of Hyper dimensional Data", An IP.com Prior Art Database Technical Disclosure, IP.com No. IPCOM000239795D, IP.com Electronic Publication Date: Dec. 2, 2014, 9 Pages.

(Continued)

*Primary Examiner* — Gordon G Liu
(74) *Attorney, Agent, or Firm* — Monchai Chuaychoo

(57) ABSTRACT

In an approach for post-modeling data visualization and analysis, a processor presents a first visualization of a training dataset in a first plot. Responsive to receiving a selection of a data group of the training dataset to analyze, a processor identifies three or fewer key model features of the data group of the training dataset. A processor ascertains a representative record of each key model feature of the three or fewer key model features using a Local Interpretable Model-Agnostic Explanation technique. A processor presents a second visualization of the three or fewer key model features and the representative record of each key model feature in a second plot.

16 Claims, 6 Drawing Sheets

(56) References Cited

OTHER PUBLICATIONS

Insane, "How To Start A Machine Learning Project—Steps To Build Your First Machine Learning Project", Insane, Apr. 1, 2021, 21 Pages.
Koehorst, G.S., "Visualization of feature importance dependencies in machine learning", University of Twente, Essay (Bachelor), 2021, 9 Pages.
Kuhn et al., "4.4 Post Modeling Exploratory Visualizations", Feature Engineering and Selection: A Practical Approach for Predictive Models, Jun. 21, 2019, 6 Pages.
Kuntal et al., "Igloo-Plot: A tool for visualization of multidimensional datasets", ScienceDirect, Genomics, vol. 103, Issue 1, Jan. 2014, 10 Pages.
Sarkar, Dipanjan, "The Art of Effective Visualization of Multi-dimensional Data", Towards Data Science, Jan. 15, 2018, 35 Pages.
Scikit-Learn, "2.5. Decomposing signals in components (matrix factorization problems)", Scikit-learn developers, Accessed Apr. 24, 2022, 14 Pages.
Zhou et al., "Facilitating Machine Learning Model Comparison and Explanation Through A Radial Visualisation", arXiv:2104.07377v1 [cs.LG], Apr. 15, 2021, 23 Pages.

\* cited by examiner

VISUALIZE DATA AND SIGNIFICANT RECORDS BASED ON RELATIONSHIP WITH THE MODEL

BACKGROUND OF THE INVENTION

The present invention relates generally to the field of data processing, and more particularly to an approach to visualize data and significant records based on relationship with the model.

Data visualization is a representation of data using common graphics, such as tables, pie charts, stacked bar charts, line charts, area charts, histograms, scatter plots, heat maps, tree maps, infographics, and animations. These visual displays of information communicate complex data relationships and data-driven insights in a way that is easy to understand. Data visualization can be utilized for a variety of purposes. For example, while text mining, data analysts and data scientists may use a word cloud to capture key concepts, trends, and hidden relationships within unstructured data. Alternatively, data analysts and data scientists may utilize a graph structure to illustrate relationships between entities of the data.

SUMMARY

Aspects of an embodiment of the present invention disclose a method, computer program product, and computer system for post-modeling data visualization and analysis. A processor presents a first visualization of a training dataset in a first plot. Responsive to receiving a selection of a data group of the training dataset to analyze, a processor identifies three or fewer key model features of the data group of the training dataset. A processor ascertains a representative record of each key model feature of the three or fewer key model features using a Local Interpretable Model-Agnostic Explanation technique. A processor presents a second visualization of the three or fewer key model features and the representative record of each key model feature in a second plot.

In some aspects of an embodiment of the present invention, prior to presenting the first visualization of the training dataset in the first plot, a processor gathers the training dataset from one or more sources. A processor identifies one or more key model features of the training dataset. A processor determines a degree of importance of the one or more key model features. A processor ranks the one or more key model features according to the degree of importance. A processor selects the three or fewer key model features based on a set of criteria, wherein the set of criteria is selected from a group consisting of: a degree of accuracy of each key model feature of the training dataset and a pre-set configuration.

In some aspects of an embodiment of the present invention, subsequent to selecting the three or fewer key model features based on the set of criteria, a processor selects a first key model feature from the three or fewer key model features selected. A processor assigns a first value to the first key model feature. A processor assigns a second value to a second key model feature and a third key model feature of the three or fewer key model features selected.

In some aspects of an embodiment of the present invention, a processor calculates the degree of accuracy of the second key model feature and the third key model feature. A processor determines that the degree of accuracy of the second key model feature and the third key model feature exceeds a first threshold. Responsive to determining the degree of accuracy exceeds the first threshold, a processor designates the key model feature as a valid feature.

In some aspects of an embodiment of the present invention, a processor calculates the degree of accuracy of the second key model feature. A processor determines that the degree of accuracy of the second key model feature does not exceed the first threshold. Responsive to determining the degree of accuracy of the second key model feature does not exceed the first threshold, adding, by one or more processors, the second key model feature to a list of candidates.

In some aspects of an embodiment of the present invention, a processor clusters the training dataset with the three or fewer key model features selected. A processor compares a first cluster with a baseline. A processor selects the three or fewer key model features of the first cluster closest within a second threshold to the baseline.

In some aspects of an embodiment of the present invention, a processor selects two key model features of the three or fewer key model features selected. A processor condenses a key model feature of the three or fewer key model features not selected into a linear combination using a Principle Component Analysis to produce a three-dimension condensed data. A processor clusters the three-dimension condensed data. A processor compares a second cluster with the baseline. A processor selects the two key model features and the condensed feature of the second cluster closest within a third threshold to the baseline.

In some aspects of an embodiment of the present invention, a processor calculates a center of a selected cluster. A processor compares the representative record of each key model feature to the calculated center of the selected cluster. A processor selects the representative record of the key model feature closest within a fourth threshold to the calculated center of the selected cluster. A processor pairs the representative record of each key model feature.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that data visualization is a representation of data using common graphics, such as tables, pie charts, stacked bar charts, line charts, area charts, histograms, scatter plots, heat maps, tree maps, infographics, and animations. Embodiments of the present invention recognize that data visualization is an important means of evaluating data because visualizing data in a graphical way may provide insights into the data. From the insights, different patterns, connections, and relationships within the data may be identified and large amounts of data may be quickly understood. Embodiments of the present invention recognize that, in addition to the graphical representation of the data, numerical factors, such as feature importance, model accuracy, confusion matrix, and Receiving Operator Characteristic (ROC) curves, are provided for an overall evaluation of the data.

Embodiments of the present invention, however, recognize that data visualization typically provides a graphical representation of the data overall. Data visualization does not provide evaluations or insights into specific portions of the data selected by a user. Therefore, embodiments of the present invention recognize the need to improve the current arts' systems and methods for post-modeling data visualization and analysis.

Embodiments of the present invention provide a system and method to present a user with a first data visualization of a training dataset in a selected plot. Three or fewer key model features of the training dataset are identified in the first data visualization. Responsive to the user selecting a data group of the training dataset to analyze more specifically, the system and method identifies three or fewer key model features of the data group selected and ascertains a representative record of each key model feature of the three or fewer key model features of the data group selected. The system and method then presents the user with a second data visualization of the three or fewer key model features of the data group selected and the representative record of each key model feature of the three or fewer key model features of the data group selected.

Implementation of embodiments of the present invention may take a variety of forms, and exemplary implementation details are discussed subsequently with reference to the Figures.

Figure 1:
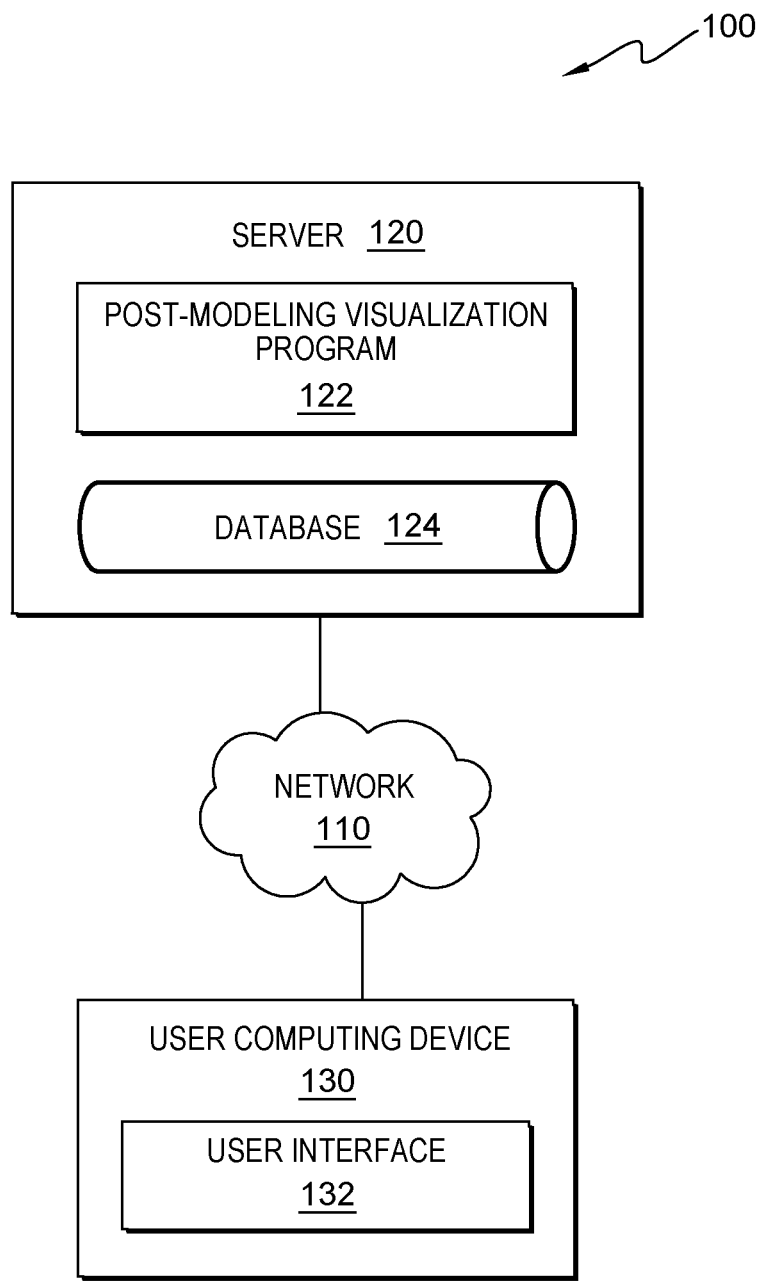
FIG. 1 is a functional block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120 and user computing device 130, and other computing devices (not shown) within distributed data processing environment 100.

Server 120 operates to run post-modeling visualization program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 4.

Post-modeling visualization program 122 operates to present a user with a first data visualization of a training dataset in a selected plot. Three or fewer key model features of the training dataset are identified in the first data visualization. Responsive to the user selecting a data group of the training dataset to analyze more specifically, post-modeling visualization program 122 operates to identify three or fewer key model features of the data group selected and to ascertain a representative record of each key model feature of the three or fewer key model features of the data group selected. Post-modeling visualization program 122 then operates to present the user with a second data visualization of the three or fewer key model features of the data group selected and the representative record of each key model feature of the three or fewer key model features of the data group selected. In the depicted embodiment, post-modeling visualization program 122 is a standalone program. In another embodiment, post-modeling visualization program 122 may be integrated into another software product. In the depicted embodiment, post-modeling visualization program 122 resides on server 120. In another embodiment, post-modeling visualization program 122 may reside on another computing device (not shown), provided that post-modeling visualization program 122 has access to network 110.

In an embodiment, the user of user computing device 130 registers with post-modeling visualization program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via post-modeling visualization program 122). Relevant data includes, but is not limited to, personal information or data provided by the user; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124. The operational steps of post-modeling visualization program 122 are depicted and described in further detail with respect to FIG. 2. An exemplary diagram illustrating a three-dimensional visualization of a training dataset after a key model feature selection is depicted and described in further detail with respect to FIG. 3A. An exemplary diagram illustrating a three-dimensional visualization of a selected data group is depicted and described in further detail with respect to FIG. 3B. An exemplary diagram illustrating a transformation during a clustering process is depicted and described in further detail with respect to FIG. 3C.

Database 124 operates as a repository for data received, used, and/or generated by post-modeling visualization program 122. A database is an organized collection of data. Data includes, but is not limited to, information about user preferences (e.g., general user system settings such as alert notifications for user computing device 130); information about alert notification preferences; one or more training datasets; and any other data received, used, and/or generated by post-modeling visualization program 122.

Database 124 can be implemented with any type of device capable of storing data and configuration files that can be accessed and utilized by server 120, such as a hard disk drive, a database server, or a flash memory. In an embodiment, database 124 is accessed by post-modeling visualization program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that post-modeling visualization program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Post-modeling visualization program 122 enables the authorized and secure processing of personal data.

Post-modeling visualization program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Post-modeling visualization program 122 provides information regarding personal and/or confidential data and the nature (e.g., type, scope, purpose, duration, etc.) of the processing. Post-modeling visualization program 122 provides the user with copies of stored personal and/or confidential company data. Post-modeling visualization program 122 allows the correction or completion of incorrect or incomplete personal and/or confidential data. Post-modeling visualization program 122 allows for the immediate deletion of personal and/or confidential data.

User computing device 130 operates to run user interface 132 through which a user can interact with post-modeling visualization program 122 on server 120. In an embodiment, user computing device 130 are each a device that performs programmable instructions. For example, user computing device 130 may each be an electronic device, such as a laptop computer, a tablet computer, a netbook computer, a personal computer, a desktop computer, a smart phone, or any programmable electronic device capable of running the respective user interface 132 and of communicating (i.e., sending and receiving data) with post-modeling visualization program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between post-modeling visualization program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from post-modeling visualization program 122 to a user via network 110. User interface 132 can also display or present alerts including information (such as graphics, text, and/or sound) sent from post-modeling visualization program 122 to a user via network 110. In an embodiment, user interface 132 is capable of sending and receiving data (i.e., to and from post-modeling visualization program 122 via network 110, respectively). Through user interface 132, a user can opt-in to post-modeling visualization program 122; create a user profile; set user preferences and alert notification preferences; input a training dataset; receive a visualization of the entire training dataset in a selected plot; select a data group; receive a visualization of the data group selected in a selected plot; receive a request for feedback; and input feedback.

A user preference is a setting that can be customized for a particular user. A set of default user preferences are assigned to each user of post-modeling visualization program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of post-modeling visualization program 122.

Figure 2:
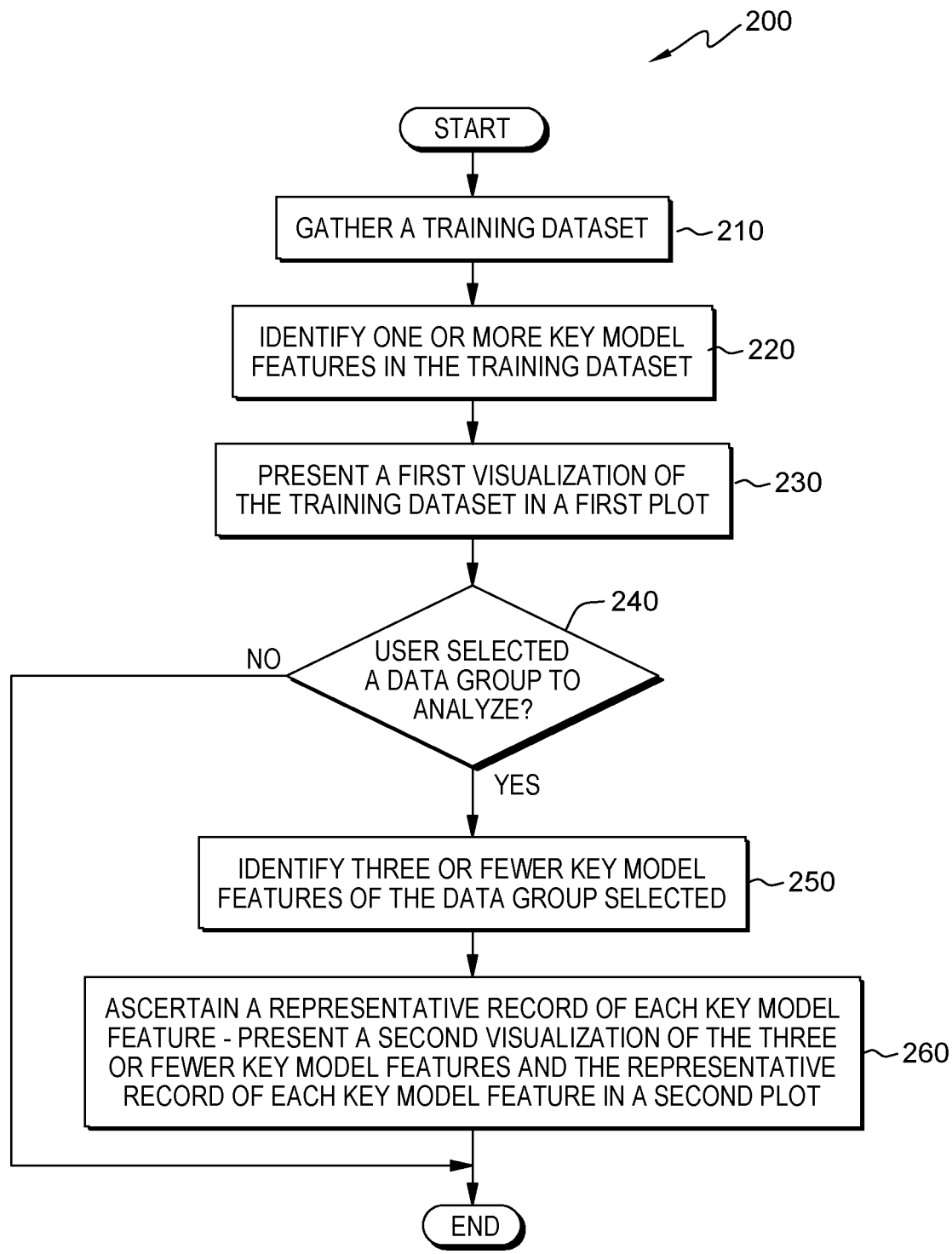
FIG. 2 is a flowchart illustrating the operational steps of a post-modeling visualization program, on a server within the distributed data processing environment of FIG. 1, in accordance with an embodiment of the present invention.

FIG. 2 is a flowchart, generally designated 200, illustrating the operational steps for post-modeling visualization program 122, on server 120 within distributed data processing environment 100 of FIG. 1, in accordance with an embodiment of the present invention. In an embodiment, post-modeling visualization program 122 operates to present a user with a first data visualization of a training dataset in a selected plot. Three or fewer key model features of the training dataset are identified in the first data visualization. Responsive to the user selecting a data group of the training dataset to analyze more specifically, post-modeling visualization program 122 operates to identify three or fewer key model features of the data group selected and to ascertain a representative record of each key model feature of the three or fewer key model features of the data group selected. Post-modeling visualization program 122 then operates to present the user with a second data visualization of the three or fewer key model features of the data group selected and the representative record of each key model feature of the three or fewer key model features of the data group selected. It should be appreciated that the process depicted in FIG. 2 illustrates one possible iteration of the process flow, which may be repeated for each training dataset gathered.

In step 210, post-modeling visualization program 122 gathers a training dataset. In an embodiment, post-modeling visualization program 122 gathers the training dataset from a user via a user interface (e.g., user interface 132) of a user computing device (e.g., user computing device 130). In another embodiment, post-modeling visualization program 122 gathers the training dataset from a database (e.g., database 124).

In step 220, post-modeling visualization program 122 identifies one or more key model features in the training dataset. In an embodiment, post-modeling visualization program 122 identifies a degree of importance of each key model feature identified. A degree of importance of a key model feature may be illustrated in a feature importance chart. A feature importance chart may rank two or more key model features based on a degree of importance of each key model feature. In another embodiment, if the degree of importance of each key model feature cannot be identified from a feature importance chart, then post-modeling visualization program 122 computes the degree of importance of each key model feature using an algorithm. The algorithm may include, but is not limited to, variable importance and sensitivity analysis.

In an embodiment, post-modeling visualization program 122 first selects a pre-set number (N) of key model features. N may be equal to three or fewer key model features. Each key model feature represents an axis in a coordinate system. A two-dimensional coordinate plane consists of a horizontal axis and a vertical axis. The horizontal axis and the vertical axis are numbered lines that intersect at right angles. The horizontal axis in the coordinate plane is called the x-axis. The vertical axis is called the y-axis A point in the coordinate plane is represented by two real numbers, or an ordered pair (a, b), where a is the x-coordinate and b is the y-coordinate. A three-dimension coordinate system consists of a x-axis, a y-axis, and a z-axis. Each axis is perpendicular to the other two axes at a point O, the origin. A point in space is represented by three real numbers, or an ordered triple (a, b, c), where a is the x-coordinate, b is the y-coordinate, and c is the z-coordinate. In an embodiment, post-modeling visualization program 122 first selects a pre-set number (N) of key model features based on a set of criteria. The set of criteria may include, but is not limited to, a pre-set degree of accuracy of each key model feature (e.g., greater than 75% accuracy) and a pre-set configuration (e.g., to select the top three key model features in a descending order).

In an embodiment, post-modeling visualization program 122 second selects a key model feature (e.g., highest ranked) from the pre-set number (N) of key model features selected. The key model feature selected is labeled the "candidate". In an embodiment, post-modeling visualization program 122 assigns a value to the key model feature selected. The value assigned to the key model feature selected is 1 (i.e., n=1). In an embodiment, post-modeling visualization program 122 assigns a value to the key model features not selected. The value assigned to the key model features not selected is "missing". In an embodiment, post-modeling visualization program 122 calculates a degree of accuracy of each of the key model features not selected (i.e., a new set of testing data).

In an embodiment, post-modeling visualization program 122 determines whether the degree of accuracy of each of the key model features not selected exceeds a given threshold. If post-modeling visualization program 122 determines the degree of accuracy of a key model feature not selected exceeds a given threshold, then post-modeling visualization program 122 designates the key model feature not selected as a valid N feature (i.e., N=n). If post-modeling visualization program 122 determines the degree of accuracy of a key model feature not selected does not exceed a given threshold, then post-modeling visualization program 122 adds the key model feature not selected (i.e., the (n+1)th top feature) to a list of candidates (i.e., n++).

In an embodiment, post-modeling visualization program 122 clusters the training dataset with a selected N feature. In an embodiment, post-modeling visualization program 122 divides the training dataset into two or more different data groups. In an embodiment, post-modeling visualization program 122 uses the clustering result as a baseline.

In an embodiment, if N>3 (i.e., greater than three key model features), post-modeling visualization program 122 selects three key model features to represent the N features selected. In an embodiment, post-modeling visualization program 122 clusters the training dataset with the three key model features selected. In an embodiment, post-modeling visualization program 122 compares the clustering results with the baseline. In an embodiment, post-modeling visualization program 122 selects the three key model features of the clustering result that are closest to the baseline.

In another embodiment, if N>3 (i.e., greater than three key model features), post-modeling visualization program 122 condenses the N features selected into three key model features. In an embodiment, post-modeling visualization program 122 selects any two features of the N features selected. In an embodiment, post-modeling visualization program 122 condenses the remaining N features (i.e., the N features not selected) into a linear combination (i.e., one dimension) with Principle Component Analysis (PCA) in order to produce a new three dimensional condensed dataset. In an embodiment, post-modeling visualization program 122 clusters the new three dimensional condensed dataset. In an embodiment, post-modeling visualization program 122 compares the clustering results with the baseline. In an embodiment, post-modeling visualization program 122 selects two original features and one condensed feature of the clustering result closest to the baseline.

For example, there are four key model features. There are four possible clustering results—i.e., four possible sets of three features. Post-modeling visualization program 122 selects three of the four key model features. Post-modeling visualization program 122 compares the clustering results with the baseline. The baseline is achieved using the remaining N features. Post-modeling visualization program 122 selects two original features and one condensed feature of the clustering result closest to the baseline.

In step 230, post-modeling visualization program 122 presents a data-visualization of the training dataset in a selected plot. The selected plot may include, but is not limited to, a one-dimensional histogram, a two-dimension plot or line graph, and a three-dimensional scatter plot. In an embodiment, post-modeling visualization program 122 presents a data-visualization of the training dataset in a selected plot via a user interface (e.g., user interface 132) of a user computing device (e.g., user computing device 130).

In decision step 240, post-modeling visualization program 122 determines whether the user selected a data group to analyze more closely. In an embodiment, post-modeling visualization program 122 determines whether the user selected a data group to analyze more closely (i.e., via a user interface (e.g., user interface 132) of a user computing device (e.g., user computing device 130). If post-modeling visualization program 122 determines the user selected a data group to analyze more closely (decision step 240, YES branch), then post-modeling visualization program 122 proceeds to step 250, identifying three key model features of the data group selected. If post-modeling visualization program 122 determines the user did not select a data group to analyze more closely (decision step 240, NO branch), then post-modeling visualization program 122 ends.

In step 250, responsive to the user selecting a data group to analyze more closely, post-modeling visualization program 122 identifies three or fewer key model features of the data group selected.

In an embodiment, post-modeling visualization program 122 clusters the training dataset for the data group selected. In an embodiment, post-modeling visualization program 122 transforms the training dataset with a target column. In an embodiment, post-modeling visualization program 122 labels each data group in the training dataset. The labels may include, but are not limited to, "target=1" (i.e., a user selected cluster) and "target=0" (i.e., another cluster).

In an embodiment, post-modeling visualization program 122 selects three key model features from the N features selected. In an embodiment, post-modeling visualization program 122 selects three key model features from the N features selected to draw a three-dimensional scatter chart for the training dataset. In an embodiment, post-modeling visualization program 122 clusters the training dataset with a key model feature selected. In an embodiment, post-modeling visualization program 122 compares the clustering results with the baseline. In an embodiment, post-modeling visualization program 122 selects up to three key model features of the clustering result closest to the baseline.

In another embodiment, post-modeling visualization program 122 condenses the N features selected into three key model features. In an embodiment, post-modeling visualization program 122 selects any two features of the N features selected. In an embodiment, post-modeling visualization program 122 condenses the remaining N features (i.e., the N features not selected) into a linear combination (i.e., 1 dimension) with PCA in order to get new a 3D condensed dataset. In an embodiment, post-modeling visualization program 122 clusters the new 3D condensed dataset. In an embodiment, post-modeling visualization program 122 compares the clustering results with the baseline. In an embodiment, post-modeling visualization program 122 selects the two original features and the condensed feature of the clustering result that is closest to the baseline.

In step 260, post-modeling visualization program 122 ascertains a representative record of each key model feature of the data group selected using a Local Interpretable Model-Agnostic Explanation (LIME) technique. LIME is a visualization technique that helps explain individual predictions of a more complex model locally. LIME is model agnostic so it can be applied to any supervised regression or classification model. The generalized algorithm LIME applies is: 1) Given an observation, permute it to create a set of replicated feature data with slight value modifications; 2) Compute a similarity distance measure between an original observation and permuted observations; 3) Apply selected machine learning model to predict outcomes of permuted data; 4) Select N number of features to best describe predicted outcomes; 5) Fit a simple model to the permuted data, explaining the complex model outcome with N features from the permuted data weighted by its similarity to the original observation; and 6) Use the resulting feature weights to explain local behavior.

In an embodiment, post-modeling visualization program 122 calculates the center of the selected cluster. In an embodiment, post-modeling visualization program 122 compares the representative records to the calculated value of the center of the selected cluster. In an embodiment, post-modeling visualization program 122 selects the representative record closest to the calculated value of the center of the selected cluster. In an embodiment, post-modeling visualization program 122 pairs the representative record list.

In an embodiment, post-modeling visualization program 122 computes an evaluation for a model on the data group selected. The evaluation may include, but is not limited to, a degree of accuracy, a ROC, and a confusion matrix of the data group selected.

In an embodiment, post-modeling visualization program 122 presents a data-visualization of the data group selected in a selected plot. The selected plot may include, but is not limited to, a one-dimensional histogram, a two-dimension plot or line graph, and a three-dimensional scatter plot. In an embodiment, post-modeling visualization program 122 presents a data-visualization of the data group selected in a selected plot via a user interface (e.g., user interface 132) of a user computing device (e.g., user computing device 130).

Figure 3A:
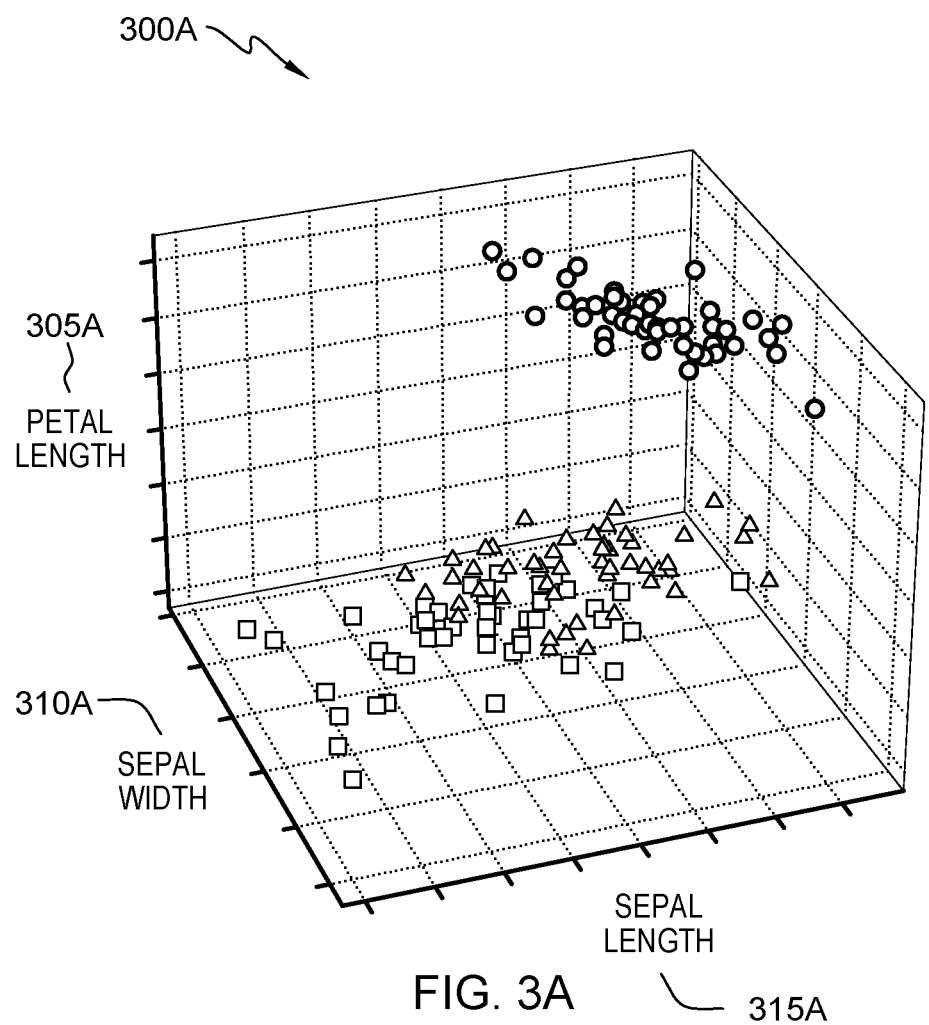
FIG. 3A is an exemplary diagram illustrating a three-dimensional visualization of a training dataset after a key model feature selection, on the server within the distributed data processing environment of FIG. 1, in accordance with an embodiment of the present invention.

FIG. 3A is an exemplary diagram, generally designated 300A, illustrating a three-dimensional visualization of a training dataset after a key model feature selection, on server 120 within distributed data processing environment 100 of FIG. 1, in accordance with an embodiment of the present invention. 305A represents the y-axis, which represents a petal length, of the three-dimensional visualization. 310A represents the z-axis, which represents a sepal width. 315A represents the x-axis, which represents a sepal length.

Figure 3B:
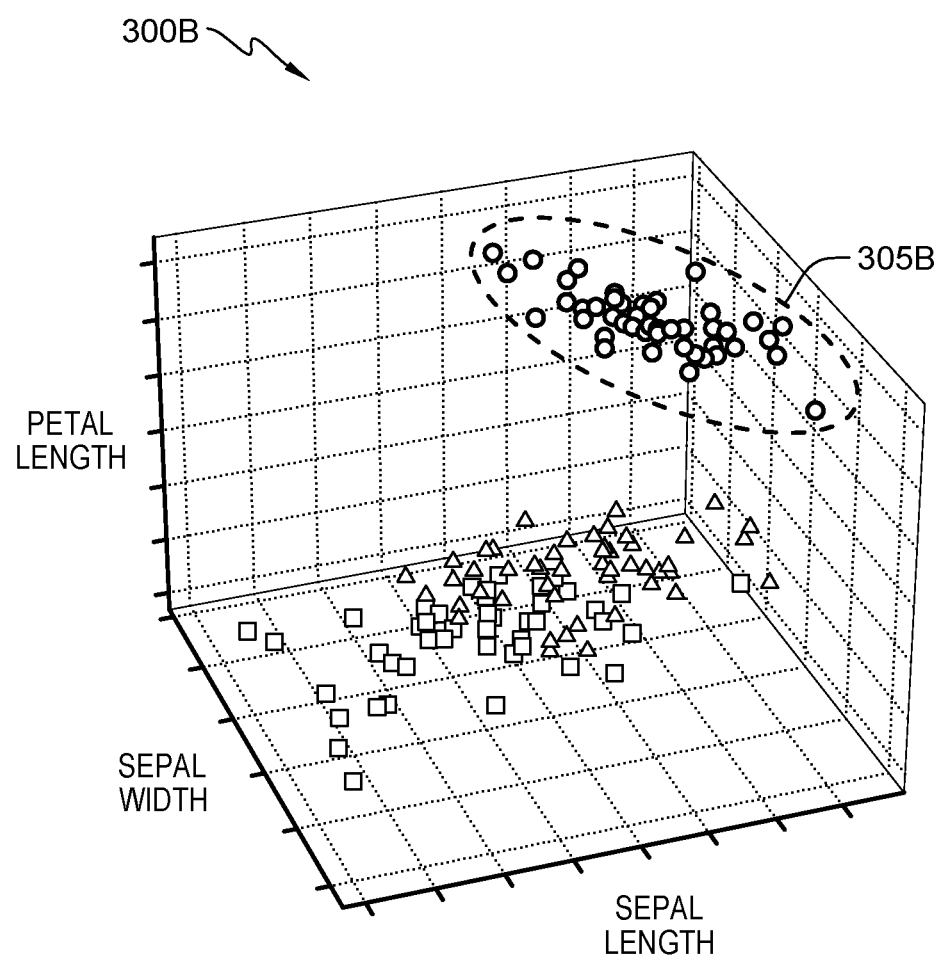
FIG. 3B is an exemplary diagram illustrating a three-dimensional visualization of a selected data group, on the server within the distributed data processing environment of FIG. 1, in accordance with an embodiment of the present invention.

FIG. 3B is an exemplary diagram, generally designated 300B, illustrating a three-dimensional visualization of a selected data group, on server 120 within distributed data processing environment 100 of FIG. 1, in accordance with an embodiment of the present invention. 305B represents a data group selected by the user to analyze more closely. 305B also represents a representative record of the data group selected. The representative record may be calculated using a cluster center identity method. After the representative record is identified, additional analysis can be performed for model interpretation. For example, a LIME method can be used for model interpretation.

Figure 3C:
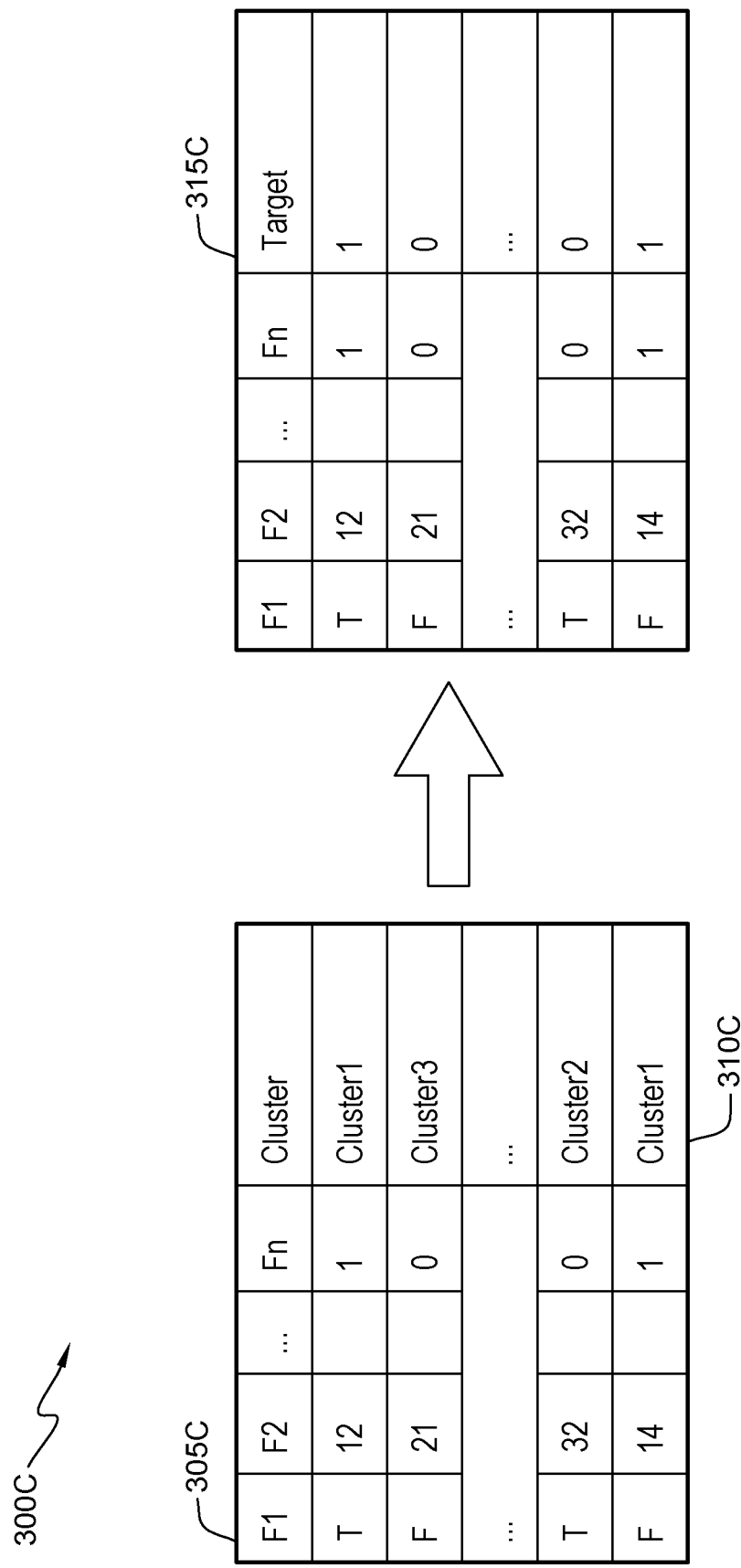
FIG. 3C is an exemplary diagram illustrating a transformation during a clustering process, on the server within the distributed data processing environment of FIG. 1, in accordance with an embodiment of the present invention.

FIG. 3C is an exemplary diagram, generally designated 300C, illustrating a transformation during a clustering process, on server 120 within distributed data processing environment 100 of FIG. 1, in accordance with an embodiment of the present invention. Post-modeling visualization program 122 clusters a training dataset (e.g., cluster-1, e.g., 310C). Each data group selected in the training dataset is given a separate column (e.g., $F_1$, $F_2$ . . . . $F_N$, e.g., 305C). Post-modeling visualization program 122 transforms the training dataset into a target (e.g., 315C). Post-modeling visualization program 122 labels each data group in the training dataset. The labels are "target=1" (i.e., a user selected the cluster) and "target=0" (i.e., a user selected another cluster). It is now a classification model. Post-modeling visualization program 122 evaluates the accuracy of the classification model. Post-modeling visualization program 122 selects three or fewer key model features.

Figure 4:
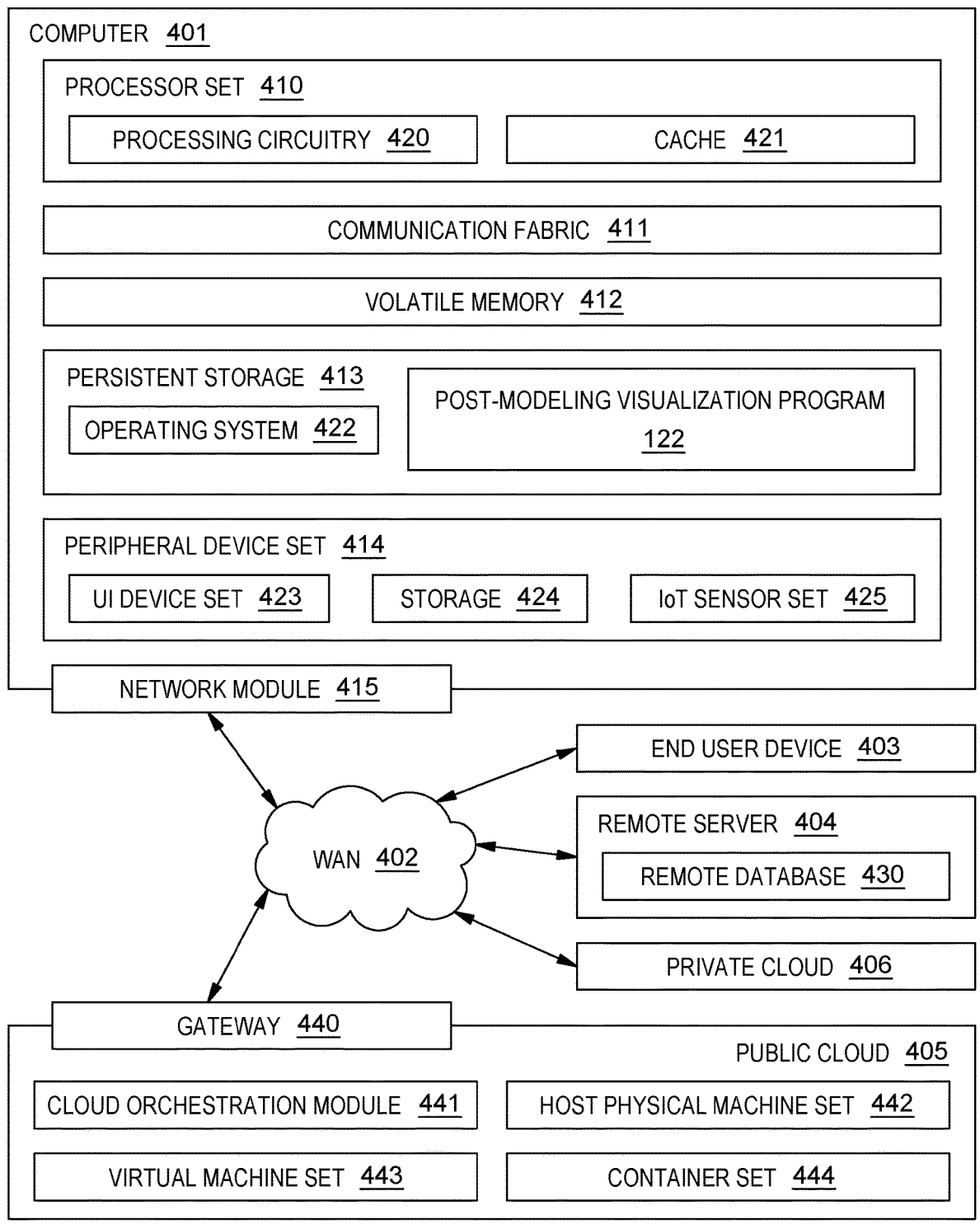
FIG. 4 depicts a block diagram of components of a computing environment representing the distributed data processing environment of FIG. 1, in accordance with an embodiment of the present invention.

FIG. 4 depicts a block diagram of components of server 120 within distributed data processing environment 100 of FIG. 1, in accordance with an embodiment of the present invention. It should be appreciated that FIG. 4 provides only an illustration of one implementation and does not imply any limitations with regards to the environments in which different embodiments can be implemented. Many modifications to the depicted environment can be made.

Computing environment 400 contains an example of an environment for the execution of at least some of the computer code involved in performing the inventive methods, such as post-modeling visualization program 122. In addition to post-modeling visualization program 122, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and post-modeling visualization program 122, as identified above), peripheral device set 414 (including user interface (UI) device set 423, storage 424, and Internet of Things (IOT) sensor set 425), and network module 415. Remote server 404 includes remote database 430. Public cloud 405 includes gateway 440, cloud orchestration module 441, host physical machine set 442, virtual machine set 443, and container set 444.

Computer 401, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in post-modeling visualization program 122 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in post-modeling visualization program 122 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   presenting, by one or more processors, a first visualization of a training dataset in a first plot;
   responsive to receiving a selection of a data group of the training dataset to analyze, identifying, by the one or more processors, three or fewer key model features of the data group of the training dataset;
   ascertaining, by the one or more processors, a representative record of each key model feature of the three or fewer key model features using a Local Interpretable Model-Agnostic Explanation technique;
   presenting, by the one or more processors, a second visualization of the three or fewer key model features and the representative record of each key model feature in a second plot;
   correcting or completing, by the one or more processors, the training dataset, wherein the training dataset is either incorrect or incomplete;
   prior to presenting the first visualization of the training dataset in the first plot, gathering, by one or more processors, the training dataset from one or more sources;
   determining, by one or more processors, a degree of importance of the one or more key model features;
   ranking, by one or more processors, the one or more key model features according to the degree of importance; and
   selecting, by one or more processors, the three or fewer key model features based on a set of criteria, wherein the set of criteria is selected from a group consisting of: a degree of accuracy of each key model feature of the training dataset and a pre-set configuration, further comprises:
     selecting, by one or more processors, two key model features of the three or fewer key model features selected; and
     condensing, by one or more processors, a key model feature of the three or fewer key model features not selected into a linear combination using a Principle Component Analysis to produce a three-dimension condensed data.

2. The computer-implemented method of claim 1, further comprising:
   subsequent to selecting the three or fewer key model features based on the set of criteria, selecting, by one more processors, a first key model feature from the three or fewer key model features selected;

assigning, by one or more processors, a first value to the first key model feature; and assigning, by one or more processors, a second value to a second key model feature and a third key model feature of the three or fewer key model features selected.

3. The computer-implemented method of claim 2, further comprising:

calculating, by one or more processors, the degree of accuracy of the second key model feature and the third key model feature;

determining, by one or more processors, that the degree of accuracy of the second key model feature and the third key model feature exceeds a first threshold; and responsive to determining the degree of accuracy exceeds the first threshold, designating, by one or more processors, the key model feature as a valid feature.

4. The computer-implemented method of claim 2, further comprising:

calculating, by one or more processors, the degree of accuracy of the second key model feature;

determining, by one or more processors, that the degree of accuracy of the second key model feature does not exceed the first threshold; and responsive to determining the degree of accuracy of the second key model feature does not exceed the first threshold, adding, by one or more processors, the second key model feature to a list of candidates.

5. The computer-implemented method of claim 1, wherein selecting the three or fewer key model features based on the set of criteria further comprises:

clustering, by one or more processors, the training dataset with the three or fewer key model features selected;

comparing, by one or more processors, a first cluster with a baseline; and selecting, by one or more processors, the three or fewer key model features of the first cluster closest within a second threshold to the baseline.

6. The computer-implemented method of claim 1, wherein ascertaining the representative record of each key model feature of the three or fewer key model features using a Local Interpretable Model-Agnostic Explanation technique further comprises:

calculating, by one or more processors, a center of a selected cluster;

comparing, by one or more processors, the representative record of each key model feature to the calculated center of the selected cluster;

selecting, by one or more processors, the representative record of the key model feature closest within a fourth threshold to the calculated center of the selected cluster; and pairing, by one or more processors, the representative record of each key model feature.

7. A computer program product comprising:

one or more computer readable storage media and program instructions stored on the one or more computer readable storage media, the program instructions comprising:

program instructions to present a first visualization of a training dataset in a first plot; responsive to receiving a selection of a data group of the training dataset to analyze, program instructions to identify three or fewer key model features of the data group of the training dataset;

program instructions to ascertain a representative record of each key model feature of the three or fewer key model features using a Local Interpretable Model-Agnostic Explanation technique, further comprises:

program instructions to calculate a center of a selected cluster;

program instructions to compare the representative record of each key model feature to the calculated center of the selected cluster;

program instructions to select the representative record of the key model feature closest within a fourth threshold to the calculated center of the selected cluster; and program instructions to pair the representative record of each key model feature;

program instructions to present a second visualization of the three or fewer key model features and the representative record of each key model feature in a second plot; and program instructions to correct or complete the training dataset, wherein the training dataset is either incorrect or incomplete.

8. The computer program product of claim 7, further comprising:

prior to presenting the first visualization of the training dataset in the first plot, program instructions to gather the training dataset from one or more sources;

program instructions to identify one or more key model features of the training dataset;

program instructions to determine a degree of importance of the one or more key model features;

program instructions to rank the one or more key model features according to the degree of importance; and program instructions to select the three or fewer key model features based on a set of criteria, wherein the set of criteria is selected from a group consisting of: a degree of accuracy of each key model feature of the training dataset and a pre-set configuration.

9. The computer program product of claim 8, further comprising:

subsequent to selecting the three or fewer key model features based on the set of criteria, program instructions to select a first key model feature from the three or fewer key model features selected;

program instructions to assign a first value to the first key model feature; and program instructions to assign a second value to a second key model feature and a third key model feature of the three or fewer key model features selected.

10. The computer program product of claim 9, further comprising:

program instructions to calculate the degree of accuracy of the second key model feature and the third key model feature;

program instructions to determine that the degree of accuracy of the second key model feature and the third key model feature exceeds a first threshold; and responsive to determining the degree of accuracy exceeds the first threshold, program instructions to designate the key model feature as a valid feature.

11. The computer program product of claim 9, further comprising:

program instructions to calculate the degree of accuracy of the second key model feature;

program instructions to determine that the degree of accuracy of the second key model feature does not exceed the first threshold; and responsive to determining the degree of accuracy of the second key model feature does not exceed the first threshold, program instructions to add the second key model feature to a list of candidates.

12. A computer system comprising:
one or more computer processors;
one or more computer readable storage media;
program instructions collectively stored on the one or more computer readable storage media for execution by at least one of the one or more computer processors, the stored program instructions comprising:
program instructions to present a first visualization of a training dataset in a first plot; responsive to receiving a selection of a data group of the training dataset to analyze, program instructions to identify three or fewer key model features of the data group of the training dataset;
program instructions to ascertain a representative record of each key model feature of the three or fewer key model features using a Local Interpretable Model-Agnostic Explanation technique, further comprises:
program instructions to calculate a center of a selected cluster;
program instructions to compare the representative record of each key model feature to the calculated center of the selected cluster;
program instructions to select the representative record of the key model feature closest within a fourth threshold to the calculated center of the selected cluster; and
program instructions to pair the representative record of each key model feature;
program instructions to present a second visualization of the three or fewer key model features and the representative record of each key model feature in a second plot; and
program instructions to correct or complete the training dataset, wherein the training dataset is either incorrect or incomplete.

13. The computer system of claim 12, further comprising:
prior to presenting the first visualization of the training dataset in the first plot, program instructions to gather the training dataset from one or more sources;
program instructions to identify one or more key model features of the training dataset;
program instructions to determine a degree of importance of the one or more key model features;
program instructions to rank the one or more key model features according to the degree of importance; and
program instructions to select the three or fewer key model features based on a set of criteria, wherein the set of criteria is selected from a group consisting of: a degree of accuracy of each key model feature of the training dataset and a pre-set configuration.

14. The computer system of claim 13, further comprising:
subsequent to selecting the three or fewer key model features based on the set of criteria, program instructions to select a first key model feature from the three or fewer key model features selected;
program instructions to assign a first value to the first key model feature; and
program instructions to assign a second value to a second key model feature and a third key model feature of the three or fewer key model features selected.

15. The computer system of claim 14, further comprising:
program instructions to calculate the degree of accuracy of the second key model feature and the third key model feature;
program instructions to determine that the degree of accuracy of the second key model feature and the third key model feature exceeds a first threshold; and
responsive to determining the degree of accuracy exceeds the first threshold, program instructions to designate the key model feature as a valid feature.

16. The computer system of claim 14, further comprising:
program instructions to calculate the degree of accuracy of the second key model feature;
program instructions to determine that the degree of accuracy of the second key model feature does not exceed the first threshold; and
responsive to determining the degree of accuracy of the second key model feature does not exceed the first threshold, program instructions to add the second key model feature to a list of candidates.

* * * * *